United States Patent [19]
Marra

[11] 3,730,658
[45] May 1, 1973

[54] SEGMENTED TIRE MOLD

[75] Inventor: Theodore F. Marra, Barberton, Ohio

[73] Assignee: The Goodyear Tire & Rubber Company, Akron, Ohio

[22] Filed: June 25, 1971

[21] Appl. No.: 156,632

[52] U.S. Cl. ................................. 425/47, 425/46
[51] Int. Cl. .................... B29h 17/00, B29h 5/08
[58] Field of Search ....................... 425/390, 28, 36, 425/38, 40, 46, 47, 39, 29, 35, 34; 25/121 UX; 249/171

[56] References Cited

UNITED STATES PATENTS

| | | | |
|---|---|---|---|
| 3,461,502 | 8/1969 | Tink et al. | 425/29 |
| 3,464,090 | 9/1969 | Cantarutti | 425/46 X |
| 3,154,814 | 11/1964 | Fike | 425/40 X |
| 3,465,385 | 9/1969 | Zangl | 425/48 X |
| 3,097,397 | 7/1963 | Leach et al. | 249/171 |
| 3,171,163 | 3/1965 | Ford et al. | 425/390 |
| 1,179,898 | 4/1916 | Coffey et al. | 425/47 |
| 3,057,011 | 1/1962 | Knox | 425/46 |
| 3,460,197 | 8/1969 | Cantarutti et al. | 425/46 |
| 1,388,255 | 8/1921 | Hardeman | 425/35 |
| 555,345 | 2/1896 | Smallwood | 25/121 UX |
| 3,553,789 | 1/1971 | Allitt | 425/36 |

FOREIGN PATENTS OR APPLICATIONS

| | | | |
|---|---|---|---|
| 1,169,118 | 4/1964 | Germany | |
| 1,239,461 | 4/1967 | Germany | 425/45 |
| 1,160,606 | 1/1964 | Germany | |

Primary Examiner—J. Howard Flint, Jr.
Attorney—F. W. Brunner et al.

[57] ABSTRACT

A tire curing mold for use in a press having a fixed platen and a movable platen, the mold including a first and a second sidewall molding member and a plurality of tread molding elements. A plurality of clevises are attached by T-bolts to a ring secured to one platen about the axis of the mold. An arm mounted on each of the tread molding elements is slotted to receive a pivot of the respective clevis so that each tread molding element is pivotable about the respective pivots. Hydraulic cylinders can lift the lower sidewall member to tilt the tread elements outwardly of and angularly with respect to the axis out of contact with a tire in the mold.

The foregoing abstract is not to be taken as limiting the invention of this application, and in order to understand the full nature and extent of the technical disclosure of this application, reference must be made to the accompanying drawings and the following detailed description.

21 Claims, 4 Drawing Figures

Patented May 1, 1973

SEGMENTED TIRE MOLD

This invention relates to the molding and curing of tires and particularly to a mold of a type commonly referred to as a "segmented mold" wherein that portion of the mold which forms a tread molding ring is divided circumferentially into a plurality of segments movable radially with respect to the mold axis, and to a tire mold press capable of cooperating both with such mold and with a conventional two-part tire mold.

A principal object of the invention is to provide a tire mold having a plurality of tread molding elements movable relatively of the mold axis and in which opening means effect a positive and arcuate movement of the respective tread elements radially outwardly of the tire and to an angular disposition with respect to the mold axis when the mold is in an open condition to minimize the potential of injury to the tire during its removal from the mold.

A further object is to provide a mold of the type described in which the several tread molding elements are registered in coaxial and closed relation with the annular sidewall members of the mold and with an endless circumferential actuating ring in response to an axially directed movement of said ring with respect to outer surfaces of the tread mold elements.

An additional object of the invention is to provide in a commercially available tire molding press modifications capable specifically of accommodating a tire mold of the type described while at the same time maintaining such press capable of expeditious changeover to use with the conventional two-piece tire mold.

The foregoing objects and others which will become apparent or be particularly pointed out in the ensuing description are accomplished in accordance with one aspect of the invention by a tire curing mold for use in a press having a fixed platen and a movable platen movable toward and away from the fixed platen, the mold comprising a first and a second sidewall molding member each respectively engageable with one said platen, a plurality of tread molding elements cooperable with said sidewall members to define a tire molding cavity, pivot means connected respectively to each of said tread molding elements, and tilting means cooperable with the pivot means to effect arcuate movement of the elements radially of and to an angular relation with one said sidewall member.

In a further aspect, the objects of the invention are accomplished by a tire mold press having a fixed platen and a movable platen movable toward and away from the fixed platen, means for moving a first sidewall member coaxially of the press toward and away from the fixed platen and means operable to move a second sidewall member toward and away from the movable platen.

In the following description of certain preferred embodiments illustrative of the principles of the invention, reference is made to the attached drawings in which.

Figure 1:
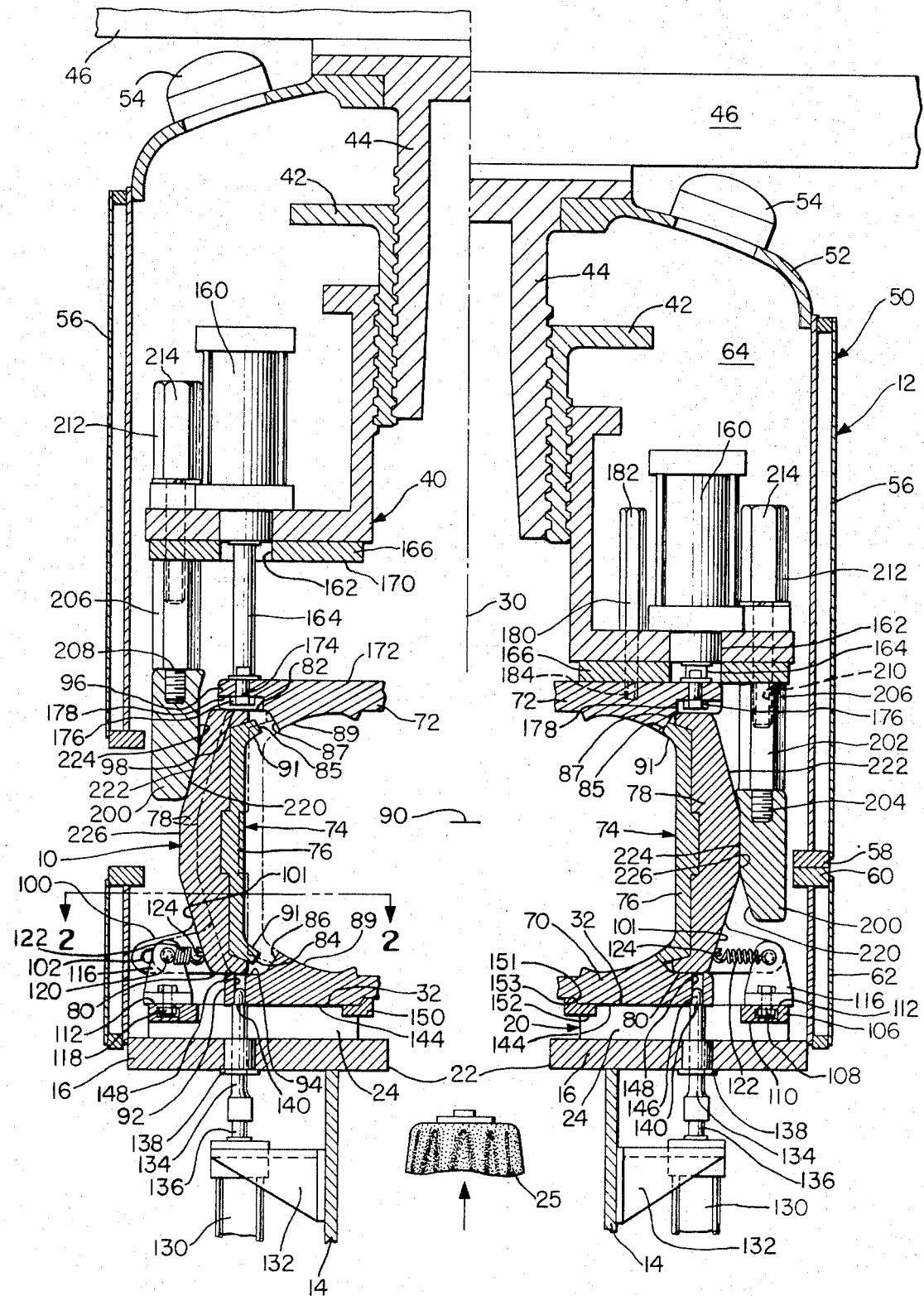
FIG. 1 is a split-section elevation view of a press and a tire mold in accordance with the invention. In the righthand portion of FIG. 1, the press and a mold are shown in a closed condition in which a tire is cured; the lefthand portion of FIG. 1 illustrates the same press and mold in a partially closed, or partially opened, condition.

Referring to the drawings and particularly to FIG. 1; a tire curing mold 10 in accordance with the invention is illustrated in combination with a tire molding press 12 modified in accordance with the invention to accommodate the mold. The press in which the modifications about to be described have been effected is of a type commercially available from the McNeil Corporation of Akron, Ohio, and is designated by them as Model 47B1.

The press 12 is erected upon a foundation (not shown) which supports a rigid column 14 to which is fixed a plate 16 forming a part of the lower platen 20. An opening 22 through the platen 20 provides for movement of a conventional tire shaping bladder and mechanism associated therewith and housed within the column coaxially of the press into and out of a tire disposed within the mold. Being known, and not forming part of the present invention, the shaping bladder and mechanism are merely indicated by the symbol 25 and not shown nor further described.

Figure 2:
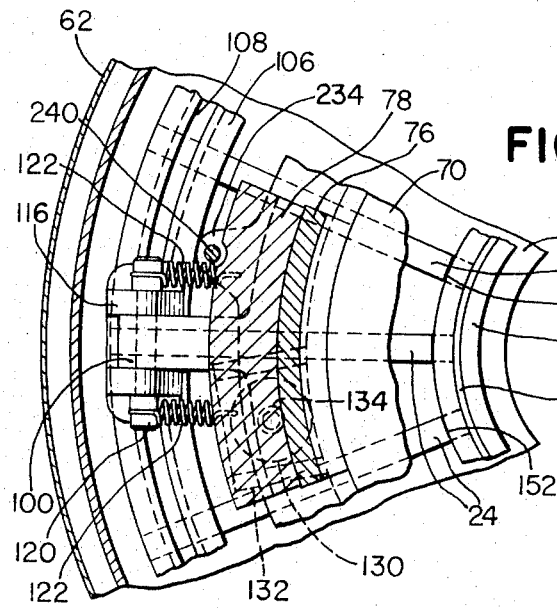
FIG. 2 is a partial view of the apparatus of FIG. 1, taken as indicated by the line 2—2 in FIG. 1, portions being removed or broken away for clarity.

A plurality of base rails 24 of rectangular cross-section are spaced angularly about the opening and extend radially, as may be seen in FIG. 2, with respect to the mold axis 30 to provide a planar platen surface 32 perpendicular to the axis.

The upper and movable platen 40 is carried by a conventional mechanism 42 provided for adjusting the shut height, which is the distance between the upper platen and the lower platen during the closed condition, of the press 12. The internal member 44 of the mechanism is secured to the main crossbeam 46 of the press.

Surrounding the mold 10 and the platens 20,40 is a steam chamber enclosure 50 the upper portion of which includes a dome 52 rigidly secured to the main crossbeam 46 and provided with access openings having removable covers 54. Secured to the dome and extending downwardly parallel to the axis is a shell 56 terminating at its lower end in a seal ring 58 which, in the closed condition of the press, engages a mating seal ring 60 carried by a lower shell 62 which is secured to the periphery of the plate 16 to extend upwardly therefrom parallel to the axis. In the closed condition of the press the dome 52 and upper and lower shells 56,62 cooperate with the plate 16 to enclose a steam chamber 64 in which the mold and a tire therewithin are heated to a temperature and for a time sufficient to effect cure of the tire.

The mold 10 in accordance with the invention comprises the sidewall mold members 70,72 and the plurality of tread molding elements 74 each of which includes a segment 76 of a complete tire tread mold ring. The segments 76 are removably inserted in a segment carrier block 78 the axial ends 80,82 of which lie, in the closed condition of the mold, in planes perpendicular to the axis 30. The respective segments 76 terminate at their axially outward ends in conical surfaces 84,85 coaxial with the mold which abut corresponding coaxially coned surfaces 86,87 formed on the respective sidewall mold members 70, 72 and extend outwardly of the tire mold cavity 90 in the tire shoulder region thereof. The slope or slopes of the respective conical surfaces is advantageously, but not necessarily, made at 90° with the immediately adjacent surfaces 89 and 91 of the mold cavity to resist premature damage to the edges formed by the respective surfaces. The lower sidewall mold member 70 has an annular flange 92 the upper surface 94 of which is slidably engageable with the end surfaces 80 of the respective blocks radially outwardly of the conical surface 86. The upper sidewall mold member 72 has an annular flange 96 the lower surface 98 of which is likewise slidably engageable with the end surfaces 82 of respective blocks 78 outwardly of the conical surface 87.

Each block has an arm 100 rigidly secured thereon extending outwardly from the lower outer wall 101. Each arm 100 has an opening or slot 102 therethrough, best seen in FIG. 3, the longitudinal dimension of which extends radially with respect to the mold axis 30 while the mold is in its closed condition.

A ring 106 having an annular T-slot 108 disposed coaxially of the platen 20 is fixed in the notches 110 formed in the radially outer ends of respective base rails 24 so that the upper surface 112 of the ring is coplanar with the surface 32 of the platen 20. A pivot bracket 116 is associated with each block 78 and removably secured to the ring 106 by the T-head bolts 118 and each supports a pivot pin 120 which extends through the slot 102 to provide pivot means about which each of the respective tread carrier blocks 78 can be pivoted.

To urge each block 78 radially outwardly a pair of tension springs 122 are connected between the block and the respective bracket 116, being attached specifically to the ends of the pivot pin 120 and to a fixture or eyelet 124 secured to the block 78 so that the springs act and extend parallel to the longitudinal dimension of the slot 102.

Figure 3:
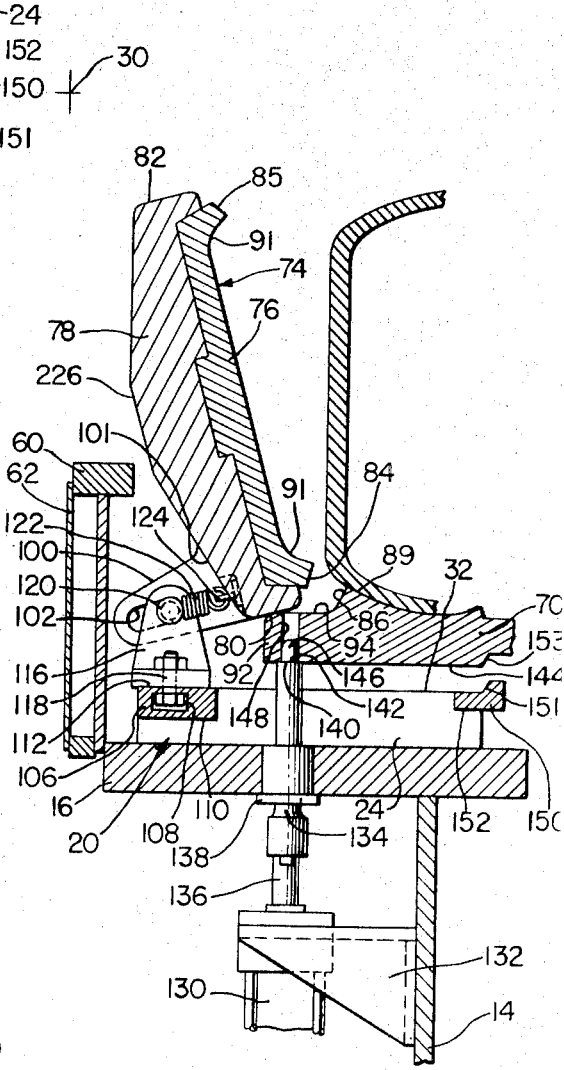
FIG. 3 is a partial elevation in section of the tire mold of FIG. 1, showing the mold in an open condition.

Referring to FIG. 3; the respective blocks 78 are tilted outwardly about the pivot pin 120 by moving the lower sidewall member 70 upwardly from the platen 20 such that the flange surface 94 acts against the end faces 80 of the respective blocks causing the same to pivot about the pivot pin during which movement the blocks are moved further outward radially by the tension springs 122. To move the lower sidewall member upwardly from the platen and to effect the tilting described, a plurality of fluid-power cylinders 130 each supported by a bracket 132 are fixed on the column 14. An extension rod 134 is removably secured to the piston rod 136 of each of the cylinders and extends through a sealing gland 138 removably affixed in the plate 16 and upwardly parallel to the axis 30 through the platen 20. The end 140 of the extension rod is reduced to form a shoulder 142 engageable with the lower surface 144 of the lower sidewall member 70 and a dowel 146 which is received in the hole 148 in the flange 92. The dowel 146 serves to maintain the lower sidewall member 70 in approximately coaxial relation with the press 12 as the member 70 is raised from or lowered to the platen 20 in response to actuation of the respective cylinders 130. The segments and the blocks 78 are returned to their vertical orientation as seen in FIG. 1 as the lower sidewall mold member, and its flange surface 94, are lowered by retracting the rods 134 as the rods 136 are moved inwardly into the cylinders 130, but are restrained from moving radially inwardly into contact with a tire by the springs 122. The dowel can be retracted by the cylinders slightly below the surface 32 of the platen, or, alternatively, be removed together with the gland 138, which is then replaced by a plug (not shown) to accommodate a conventional two-part tire mold.

A pilot ring 150 having a cone 151 coaxial with the press projecting upwardly of the surface 32 is fixed in seats 152 formed in the inward ends of the rails 24. The cone 151 provides at least approximate coaxial registry of the lower member 70 by engaging a conical coaxial recess 153 formed in the latter upwardly from its lower surface 144.

To move the upper sidewall mold member 72 coaxially of and relatively with respect to the upper platen 40, and to move the flange surface 98 into engagement with the end faces 82 of the respective blocks 78 during closing of the mold 10, a plurality of fluid-power cylinders 160 are mounted upon the upper platen 40 which is, in accordance with the invention, modified to accommodate the cylinders 160 and to provide openings 162 through which the piston rods 164 extend parallel to the axis 30. An annular spacer 166 is attached to and made a part of the upper platen 40 to provide a platen surface 170 perpendicular to the axis which is engageable with the axially outward surface 172 of the upper mold member. The piston rods are each extended through openings 174 provided in the flange 96 and the sidewall mold members 72 are secured to the respective piston rods 164 by the nuts 176 accommodated in recesses 178 formed in the flange 96 below the surface 98. It will be apparent that a single cylinder mounted coaxially of the press can as well provide the described movements, replacing the plurality of cylinders.

For convenience in securing the upper sidewall mold member 72 to the respective piston rods 164 and for disconnecting the piston rods from the upper sidewall mold member, a plurality of bolts 180 having elongated wrench-heads 182 are extended through suitable openings in the platen 40 and threaded into holes 184 provided in the sidewall member 72. The bolts are accessible through the access openings by removing the covers 54. The piston rods are retractable into the openings 162 provided in the platen and retained therein when the press accommodates a conventional two-part mold.

The mold 10 includes a circumferentially endless ring 200 which operates to close and lock the blocks 78 and the respective tread molding segments 76. The ring 200 is removably secured to the platen 40 by a plurality of connectors 202 each having a bolt threaded portion 204 threadably received in a hole in the ring and a hexagonal socket portion 206 extending between the platen surface 170 and the axial upward face 208 of the ring. The socket portion 206 receives the bolt threaded portion 210 of a fastener 212 having an elongated wrench-head 214 which bears on the platen and is accessible through the access openings. The inward surface of the ring 200 includes a wedging surface 220 which is coaxially conical and engageable with wedge surfaces 222 of the respective blocks 78 to move the blocks radially inwardly in response to movement of the platen 40 downwardly toward the lower platen 20, and a cylindrical locking surface 224 parallel to the axis 30 which is slidingly engageable with the outer surface 226 of each block with further movement of the platen toward the lower platen. As the tread blocks 78 are moved radially inwardly to close the mold, the sidewall members 70 and 72 are brought into coaxial registry with the ring 200 by cooperative engagement of the respective conical surfaces 84 with 86 and 85 with 87 without imposing stresses in the press 12 normal to the axis 30.

Figure 4:
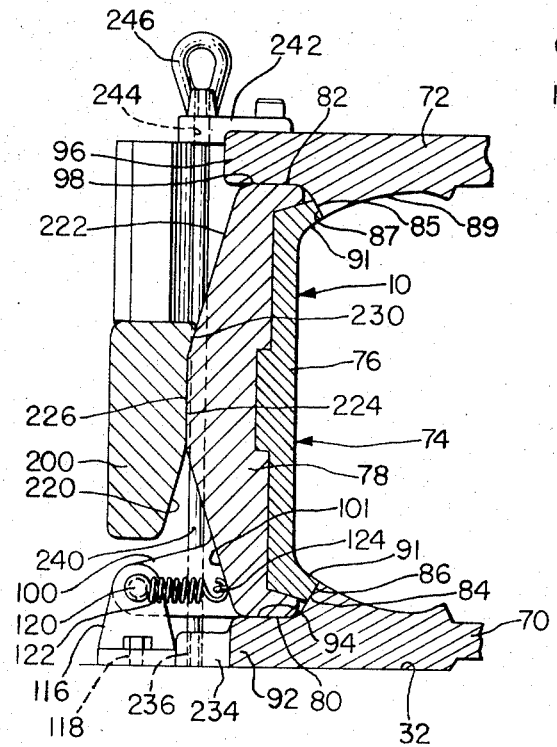
FIG. 4 is a further partial elevation, partly in section, of the mold of FIG. 1.

Referring to FIG. 4; in a further aspect, the invention provides for convenient transport and storage of the mold 10 as a unitary assembly. The actuating ring 200 includes a conical surface 230 converging upwardly from the locking surface. When released from the upper platen 40 the converging surface 230 rests upon the wedge surfaces 222 of the respective blocks 78 to maintain the blocks in their radially inwardly closed position and to retain the ring 200 securely encompassing the blocks. A plurality of lugs 234 secured to or made integral with the sidewall mold member 70 extend radially outwardly of the flange 92 and have a hole 236 in which a tie bolt 240 is threaded. The upper sidewall mold member 72 is also provided with a lug 242 secured thereto and which has an opening 244 through which the bolt 240 extends into threaded engagement with a lifting ring 246. The entire mold 10 is thus secured as a unitary assembly for convenient transport and storage.

It will be apparent that the mold according to the instant invention has numerous advantages over segmented type molds of the prior art wherein presses had necessarily to be specially adapted only for their use or over molds, on the other hand, which require numerous and/or complex parts, for use in conventional tire mold presses.

A further advantage of the present invention lies in the fact that the tread molding elements are positively tilted away and withdrawn from molding contact with the tire without inducing distortion into the tire itself which, as is well known, tends immediately after curing to be readily damaged.

An advantage also is found in the fact that the sidewall plates by virtue of the conical fit with the respective shoulder portions of the tread mold inserts are caused to be located in exact concentricity with the actuating ring. Minor inaccuracies in the motions of the press or in the location of one or the other or both sidewall plates with respect to the platens is not productive of distortions or undue stresses either in the mold or in the press.

While certain representative embodiments and details have been shown for the purpose of illustrating the invention, it will be apparent to those skilled in the art that various changes and modifications may be made therein without departing from the spirit or scope of the invention.

What is claimed is:

1. A tire curing mold for use in a press having a fixed platen and a movable platen movable toward and away from the fixed platen, said mold comprising a first and a second sidewall molding member each respectively mounted for movement normal to and engageable with its associated platen, a plurality of tread molding elements cooperable with said first and second sidewall members to define a tire molding cavity, pivot means connected respectively to each of said tread molding elements, and tilting means fixed with respect to one of said fixed platen and said movable platen and cooperable with said pivot means independent of the presence of said tire to effect arcuate movement of said elements radially of and to an angular relation with one said sidewall member associated with the latter one said platen.

2. A tire curing mold as claimed in claim 1, said tilting means including first means on one of said sidewall members cooperable with second means on each respective tread molding element to effect said movement of said tread elements in response to movement of one of said first means and said second means axially relative to the other of said first means and said second means.

3. A tire mold as claimed in claim 1, wherein each said element is provided with a radially outward surface extending coaxially of the mold axis and with a wedge surface inclined with respect to said axis inwardly of said outward surface, said mold further including closing means including ring means having a locking surface coaxially and slidably engageable with said radially outward surface and extending parallel to said axis and a wedging surface inclined with respect to said axis parallel to and engageable with said wedge surface.

4. A mold as claimed in claim 3, wherein said ring means is provided with means for securing the same rigidly and coaxially to one said platen.

5. A mold as claimed in claim 3, wherein said closing means is provided with an inclined rest surface sloping inwardly of said parallel surface for engagement with the wedge surfaces of the respective tread mold elements to carry said ring means only on said elements while said mold is transported as an assembly.

6. A mold as claimed in claim 5, including securement means extending between and removably secured to the top and the bottom sidewall members.

7. A mold as claimed in claim 6, said securement means comprising a plurality of lugs attached respectively to each of the top and bottom mold members and a plurality of bolts engageable respectively with said lugs of said bottom member and extending transversely of the said top member, said bolts each having a lifting ring attached thereto.

8. A mold as claimed in claim 1, said pivot means comprising a pivot bracket securable rigidly to one of said platens, an arm extending outwardly of and secured rigidly to the respective said element, a pivot pin connecting each said bracket pivotably to the respective said arm.

9. A mold as claimed in claim 8, further including tension spring means connected between each tread molding element and the respective said bracket and effective to urge said element outwardly of at least one sidewall member.

10. A mold as claimed in claim 9, wherein said pivot pin is fixed in said bracket and said arm is provided with a slot accommodating said pivot pin and whereby each element is movable toward and away from the respectively associated pivot pin.

11. A mold as claimed in claim 1, said tilting means comprising means for moving one of said sidewall members axially with respect to the respectively associated one of said platens.

12. A mold as claimed in claim 11, said means for moving said sidewall member comprising at least one hydraulic cylinder mounted on said press and effective to move the respective sidewall member relatively with respect to the respectively associated platen.

13. A tire mold as claimed in claim 12, wherein the respective said sidewall member is provided with locating means fixed radially of the mold axis cooperably engageable with locating means fixed with respect to the respectively associated platen and effective to locate said member coaxially of said platen when the same is engaged with said platen.

14. A tire mold press comprising a fixed platen and a platen movable toward and away from said fixed platen, a first and second sidewall mold member, a plurality of tread mold segments, means for moving a first sidewall mold member coaxially of said press toward and away from supporting engagement with said fixed platen, means operable to move a second sidewall mold member toward and away from supporting engagement with the said movable platen, and a plurality of pivot means mounted on one of said fixed and said movable platen for pivoting respectively each of a plurality of tread molding segments angularly outwardly of the mold axis in response to movement of the respectively associated one of said means for moving a first sidewall mold member and means operable to move a second sidewall mold member.

15. A tire mold press as claimed in claim 14, said means operable to move said second sidewall mold member comprising hydraulic cylinder means fixed relative to the movable platen and having rod means attachable to said second sidewall mold member.

16. A tire mold press as claimed in claim 14, said means operable to move said second sidewall member comprising a plurality of hydraulic cylinders fixed relative to said movable platen and each cylinder having a piston rod end attachable to said second sidewall mold member.

17. A tire mold press as claimed in claim 14, said means for moving said first sidewall member comprising a plurality of hydraulic cylinders fixed relatively of said fixed platen and each cylinder having piston rod means extending and movable through said fixed platen.

18. A tire mold press as claimed in claim 17, said means operable to move said second sidewall member comprising a plurality of hydraulic cylinders fixed relative to said movable platen and each cylinder having a piston rod end attachable to said second sidewall mold member.

19. A tire mold press as claimed in claim 18, further including means for mounting said pivot means in spaced circumferential arrangement on one said platen, said pivot means each being connectable respectively with one of said plurality of tread molding segments each movable radially of the mold axis.

20. A tire mold press as claimed in claim 19, said means for mounting said pivot means comprising an annular ring having a circumferentially extending T-slot fixed in coaxial relation with one said platen.

21. A tire mold press as claimed in claim 20, said press having mechanism for inserting a curing bladder into a tire within the mold cavity.

* * * * *